No. 873,686. PATENTED DEC. 10, 1907.
A. B. SHARP.
CHALK LINE HOLDER.
APPLICATION FILED APR. 27, 1906.
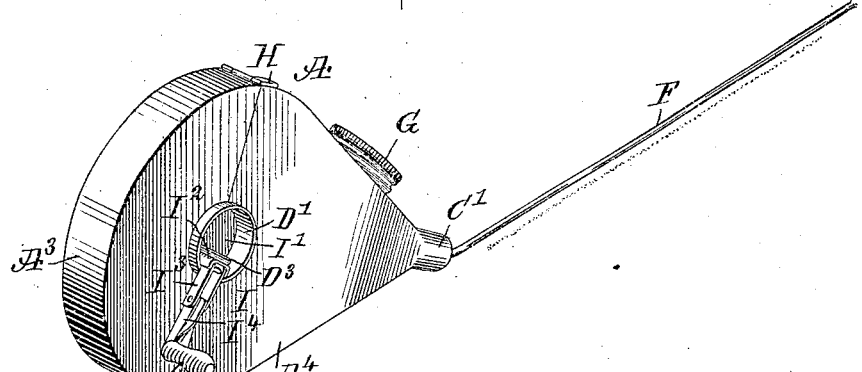
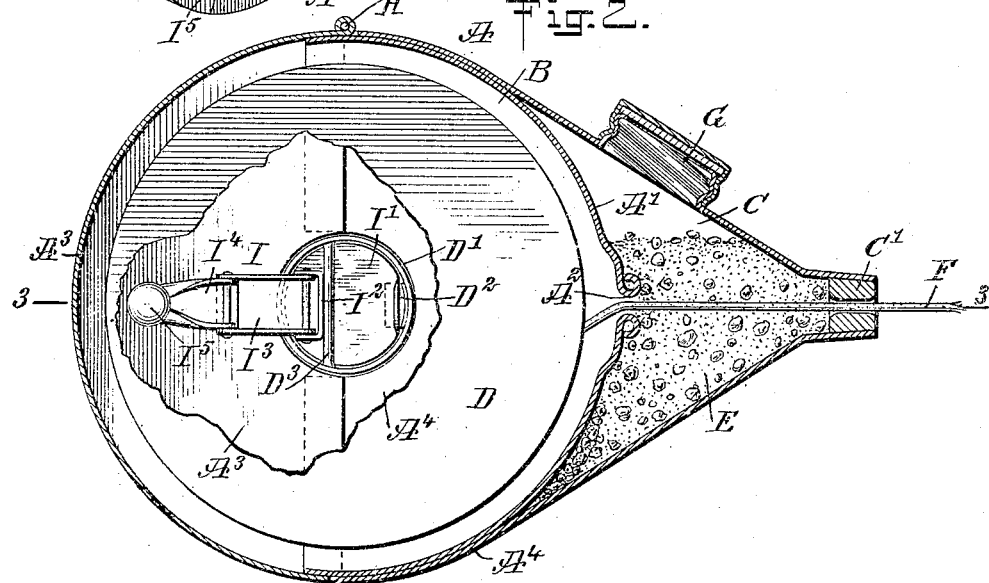
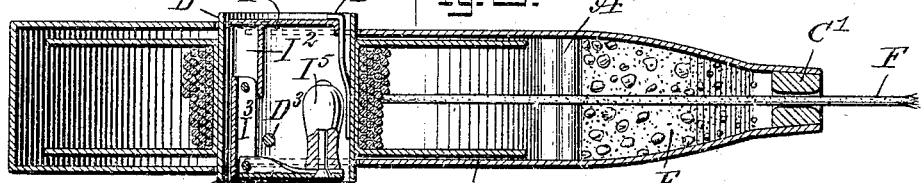
WITNESSES
INVENTOR
Abel Benjamin Sharp
BY
ATTORNEYS

UNITED STATES PATENT OFFICE.

ABEL BENJAMIN SHARP, OF ATLANTA, IDAHO, ASSIGNOR OF ONE-HALF TO HENRY CRAB, OF ATLANTA, IDAHO.

CHALK-LINE HOLDER.

No. 873,686.

Specification of Letters Patent.

Patented Dec. 10, 1907.

Application filed April 27, 1906. Serial No. 314,006.

*To all whom it may concern:*

Be it known that I, ABEL BENJAMIN SHARP, a citizen of the United States, and a resident of Atlanta, in the county of Elmore and State of Idaho, have invented a new and Improved Chalk-Line Holder, of which the following is a full, clear, and exact description.

The invention relates to wood-working tools, and its object is to provide a new and improved chalk line holder arranged to insure a thorough chalking of the line when unreeling the same and drawing the line into chalking position.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a perspective view of the improvement; Fig. 2 is an enlarged sectional side elevation of the same, and Fig. 3 is a sectional plan view of the same on the line 3—3 of Fig. 2.

The casing A of the chalk line holder is provided with a transverse partition A' for dividing the interior of the casing into a reel chamber B and a chalk chamber C, of which the reel chamber B contains a reel D and the chalk chamber C is adapted to contain chalk E or a like material, through which a chalk line F is drawn so as to become chalked. The chalk chamber C is provided on top with a suitable filling nozzle G for filling the chamber C with chalk or a like material. The partition A' is provided at or near its middle with an elongated guide aperture $A^2$ through which passes the line F as the latter unreels from the reel D, and the chalk chamber C is provided with outlet C' for the passage of the line F from the chamber C, said outlet and the aperture $A^2$ being arranged in a line radial to the reel D, as plainly shown in Fig. 2. Access is had to the reel chamber B by making this portion of the casing in two sections $A^3$ and $A^4$, of which the section $A^3$ is hinged at $A^5$ to the section $A^4$ which also supports the chamber C. The free end of the hinged section $A^3$ is adapted to be fastened to the section $A^4$ by a suitable fastening device H such as a pin engaging registering eyes on the sections $A^3$ and $A^4$.

The hub D' of the reel D is made hollow and is journaled in the sides of the sections $A^3$ and $A^4$, and the said hub is provided with a crank arm I for turning the reel D in order to wind up the line F. The crank arm I consists essentially of a disk I' mounted to slide transversely in the hollow hub D' and the sliding movement of the disk I' is limited by a spring catch $D^2$ and a cross-bar $D^3$ both arranged in the hub D'. On the inner face of the disk I' is formed a lug $I^2$ on which is hinged the inner end section $I^3$ of the shank having a section $I^4$ hinged to the section $I^3$. On the outer end of the shank section $I^4$ is arranged a knob $I^5$, adapted to be taken hold of by the operator, for turning the reel D with a view to wind up the line F whenever it is desired to do so. Now, by constructing the crank arm I as described, the shank sections $I^3$ and $I^4$ can be swung into an angular position, as shown in Fig. 3, to allow of folding the entire crank arm into the hub D', the disk I' then resting against the spring catch $D^2$.

When it is desired to use the crank arm, the operator takes hold of the shank section $I^4$ and pulls the same outward so that the disk I' slides transversely in the hub D' until the disk butts against the cross-bar $D^3$. When this takes place the outer end of the lug $I^2$ projects beyond the end of the hub D' to allow of swinging the shank sections $I^3$ and $I^4$ into the extended position shown in Figs. 1 and 2 to permit the operator to take hold of the knob $I^5$ for turning the reel.

From the foregoing it will be seen that the chalk chamber C can be readily filled with chalk and the reel D can be readily removed from its chamber B whenever it is desired to do so and necessary in case of renewing the chalk line F.

The device is very simple and durable in construction, and when the line F is drawn out it readily takes up a considerable amount of chalk E to thoroughly chalk the line immediately previous to using the same in the usual manner.

Having thus described my invention, I claim as new and desire to secure by Letters Patent:—

1. A chalk line holder, comprising a casing having a reel chamber and a chalk chamber terminating in an outlet and having an aperture communicating with the reel chamber, a reel removably held in the said reel chamber and having its line extending through the said aperture, the chalk chamber and the said outlet, the said reel having a hollow hub journaled in the sides of the casing, and a crank arm for turning the reel, the crank arm comprising hinged sections and mounted to slide within the hollow hub.

2. A chalk line holder, comprising a casing having a reel chamber and a chalk chamber terminating in an outlet, and having an aperture communicating with the reel chamber, a reel removably held in the said reel chamber and having its line extending through the said aperture, the chalk chamber and the said outlet, the said reel having a hub journaled in the sides of the casing and a crank arm for turning the reel, the crank arm comprising a disk fitted to slide axially of the said hub, a shank made in sections hinged together, the inner section being hinged to the said disk, and a knob on the end of the outer shank section.

3. A chalk line holder, comprising a casing having a reel chamber and a chalk chamber terminating in an outlet, and having an aperture communicating with the reel chamber, a reel removably held in the said reel chamber and having its line extending through the said aperture, the chalk chamber and the said outlet, the said reel having a hub journaled in the sides of the casing and a crank arm for turning the reel, the crank arm comprising a disk fitted to slide axially of the said hub, a shank made in sections hinged together, the inner section being hinged to the said disk, a knob on the end of the outer shank section, and stops in the said hub for limiting the sliding motion of the said disk.

4. A chalk line holder, comprising a casing having a reel chamber and a chalk chamber terminating in an outlet and having an aperture communicating with the reel chamber, the latter being made in sections hinged together, a reel removably held in the said reel chamber and having its line extending through the said aperture, the chalk chamber and the outlet, the hub of the reel being hollow and journaled in the sides of the said sections, and means for turning the reel, the said means being connected with the hollow hub and mounted to slide therein.

5. A reel provided with a hollow hub and a crank arm for turning the reel, and comprising a disk mounted to slide axially of the said hub, a shank made in sections hinged together, the end of the inner section being hinged to the said disk, and a knob on the outer section.

6. A reel provided with a hollow hub and a crank arm for turning the reel, and comprising a disk mounted to slide axially of the said hub, a shank made in sections hinged together, the end of the inner section being hinged to the said disk, a knob on the outer section, and stops on the hub for limiting the sliding motion of the said disk.

7. A chalk line holder, comprising a casing having a transverse partition dividing the interior of the casing into a reel chamber and a chalk chamber terminating in an outlet, the said chalk chamber having a filling opening, the partition having at or near its middle an elongated guide aperture, a reel removably held in the said reel chamber and having its line extending through the said guide aperture, the chalk chamber and the said outlet, the said reel having a hollow hub journaled in the sides of the casing, and means for turning the reel, the said means being mounted to slide within the hollow hub.

8. In a device of the character described, a hollow shaft, a reel mounted thereon, a line carried by said reel, a crank arm normally seated within said hollow shaft and adapted to be slid therefrom in order to rotate the same.

9. In a device of the character described, a hollow shaft, a reel mounted thereon, a handle normally seated within said shaft, and means carried by said shaft with which said handle engages in operative position in order to rotate said reel.

10. In a device of the character described, a hollow shaft, a reel mounted thereon, a crank arm normally seated within said shaft, and a pin carried by said shaft with which said crank arm engages when in operative position to rotate said reel.

11. In a device of the character described, a hollow shaft, a crank arm normally seated within said shaft, means carried by said shaft and said crank arm which are adapted to engage, whereby the crank arm and shaft are connected and a knob or handle on said crank arm.

In testimony whereof I have signed my name to this specification in the presence of two subscribing witnesses.

ABEL BENJAMIN SHARP.

Witnesses:
 FRITZ. SCHOLL,
 WALDO ROSS HURST.